United States Patent
Luo et al.

(10) Patent No.: US 12,541,006 B2
(45) Date of Patent: Feb. 3, 2026

(54) ANTI-INTERFERENCE PROCESSING METHOD AND APPARATUS FOR MULTI-PULSE LASER RADAR SYSTEM

(71) Applicant: SUTENG INNOVATION TECHNOLOGY CO., LTD., Shenzhen (CN)

(72) Inventors: Site Luo, Shenzhen (CN); Xia Liu, Shenzhen (CN); Dongshan Liu, Shenzhen (CN); Junpeng Yang, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 1261 days.

(21) Appl. No.: 17/356,443

(22) Filed: Jun. 23, 2021

(65) Prior Publication Data
US 2021/0333360 A1    Oct. 28, 2021

Related U.S. Application Data

(63) Continuation of application No. PCT/CN2020/093339, filed on May 29, 2020.

(30) Foreign Application Priority Data

May 31, 2019  (CN) .................. 201910468384.2
May 31, 2019  (CN) .................. 201910468936.X

(51) Int. Cl.
- *G01S 7/48*   (2006.01)
- *G01S 7/487*  (2006.01)
- *G01S 7/499*  (2006.01)

(52) U.S. Cl.
CPC ............ *G01S 7/4802* (2013.01); *G01S 7/487* (2013.01); *G01S 7/499* (2013.01)

(58) Field of Classification Search
CPC ........ G01S 7/4802; G01S 7/487; G01S 7/499; G01S 7/4814; G01S 7/4876; G01S 17/931; G01S 7/484
See application file for complete search history.

(56) References Cited

U.S. PATENT DOCUMENTS

| | | | |
|---|---|---|---|
| 11,564,578 B2 * | 1/2023 | Haji Reza | A61B 5/0095 |
| 2009/0073855 A1 * | 3/2009 | Ishii | G11B 7/082 |

(Continued)

FOREIGN PATENT DOCUMENTS

| | | |
|---|---|---|
| CA | 2051542 A1 | 3/1992 |
| CN | 1061874 A | 6/1992 |

(Continued)

OTHER PUBLICATIONS

International Search Report issued in corresponding international application No. PCT/CN2020/093339, dated Sep. 7, 2020, 5 pages.

(Continued)

*Primary Examiner* — Isam A Alsomiri
*Assistant Examiner* — Joseph C Fritchman
(74) *Attorney, Agent, or Firm* — BAYES PLLC

(57) ABSTRACT

This application relates to a multi-pulse anti-interference signal processing apparatus. The multi-pulse anti-interference signal processing apparatus includes a detection pulse sending unit and a pulse receiving unit. The detection pulse sending unit is configured to emit a plurality of laser pulses to a target object based on a preset emission interval within a cycle. The pulse receiving unit is configured to receive a plurality of external signals within the cycle, obtain a reception interval between any two external signals, and determine, in the plurality of external signals based on the emission interval and the reception interval, an echo signal corresponding to the emitted laser pulses. A false echo pulse resulting from optical-to-electrical conversion and an inter- (Continued)

fering echo pulse fed back by other radar are effectively eliminated. Therefore, a signal-to-noise ratio of a target echo pulse is increased, mutual interference between a plurality of radars is effectively eliminated, and accuracy of ranging performed by a radar by using a laser pulse is improved.

5 Claims, 14 Drawing Sheets

(56) References Cited

U.S. PATENT DOCUMENTS

| | | | |
|---|---|---|---|
| 2012/0313814 | A1 | 12/2012 | Kojima |
| 2018/0239005 | A1* | 8/2018 | Dussan ................ G01S 7/4865 |
| 2018/0341022 | A1* | 11/2018 | Guo ........................ G06F 18/21 |
| 2018/0373011 | A1* | 12/2018 | Doi ..................... G02B 21/0076 |

FOREIGN PATENT DOCUMENTS

| | | |
|---|---|---|
| CN | 1266298 A | 9/2000 |
| CN | 101520955 A | 9/2009 |
| CN | 102176004 A | 9/2011 |
| CN | 102269908 A | 12/2011 |
| CN | 102759728 A | 10/2012 |
| CN | 103149559 A | 6/2013 |
| CN | 103885065 A | 6/2014 |
| CN | 103972780 A | 8/2014 |
| CN | 104102064 A | 10/2014 |
| CN | 105388464 A | 3/2016 |
| CN | 105759279 A | 7/2016 |
| CN | 104765040 A | 3/2017 |
| CN | 106546993 A | 3/2017 |
| CN | 107884780 A | 4/2018 |
| CN | 108681093 A | 10/2018 |
| CN | 108717182 A | 10/2018 |
| CN | 109655810 A | 4/2019 |
| CN | 109683171 A | 4/2019 |
| CN | 109799512 A | 5/2019 |
| CN | 11017466 A | 8/2019 |
| EP | 2605034 A1 | 6/2013 |
| GB | 1464424 A | 2/1977 |
| JP | S62174676 A | 7/1987 |
| WO | 2018224234 A1 | 12/2018 |

OTHER PUBLICATIONS

First Office action issued in related Chinese Application No. 201910468384.2, dated Sep. 18, 2020, 18 pages.

Yumeng Zhai, et al, "Design and Realization of Polarization Beam Splitter Mixed and Integrated in Polymer Optical Waveguide", Proceedings of the 17th National Optical Fiber Communication and the 18th Academic Conference on Integrated Optics, p. 413-416.

Second Office action issued in related Chinese Application No. 201910468384.2, dated Apr. 30, 2021, 13 pages.

First Office Action issued in related Chinese Application No. 201910468936.X, mailed Jan. 12, 2023, 14 pages.

Dai Can, "Lidar Echo Signal Enhancement and Waveform Decomposition", May 23, 2016, 69 pages.

Zhihui Sun et al., "Pulsed laser ranging techniques based on digital signal processing methods for automobile anti-collision application", Proc. of SPIE vol. 7160 716023-1, 2009, 11 pages.

* cited by examiner

ANTI-INTERFERENCE PROCESSING METHOD AND APPARATUS FOR MULTI-PULSE LASER RADAR SYSTEM

CROSS-REFERENCE OF RELATED APPLICATIONS

This application is a bypass continuation of PCT Application No. PCT/CN2020/093339 filed on May 29, 2020, which claims priority to Chinese Patent Application No. CN 201910468936.X, filed with the China National Intellectual Property Administration on May 31, 2019, and entitled "DUAL-PULSE ANTI-INTERFERENCE SIGNAL PROCESSING METHOD", and Chinese Patent Application No. CN201910468384.2, filed with the China National Intellectual Property Administration on May 31, 2019, and entitled "LASER RADAR SYSTEM AND LASER RADAR ECHO SIGNAL DETERMINING METHOD", which are incorporated herein by reference in their entireties.

TECHNICAL FIELD

This application relates to the field of radar ranging technologies, and in particular, to a multi-pulse laser radar anti-interference signal processing method and apparatus.

BACKGROUND

Currently, a laser radar receiver using a time of flight (TOF) principle is an optical-to-electrical converter that converts an optical signal into an electrical signal. To increase a ranging distance of a radar, a detector with a comparatively high sensitivity is usually used. However, during operating of the radar, there are a dark count and a background light noise. The dark count and the background light noise have no difference from a real signal, and therefore are recognized as a real signal, thereby causing ranging interference to a coaxial laser radar. When a large number of vehicles are equipped with laser radars and the laser radars operate in a same region simultaneously, mutual interference also occurs between the laser radars. To be specific, a pulse signal received by a laser radar is not necessarily a laser pulse emitted by the laser radar, but may be a laser pulse emitted by another laser radar. For example, after a laser pulse emitted by a radar A is irradiated onto a target detection object, the laser pulse is detected by a radar B, and the radar B generates an echo signal. Two echoes generated by the radar A and the radar B have a completely same form and feature, and can hardly be distinguished, thereby affecting detection performance and a ranging effect of the radars.

Therefore, in a conventional technical solution, a false echo signal exists during ranging of an ultrasonic radar, thereby causing a high signal-to-noise ratio of a target echo signal. When different laser radars operate in a same region, a signal received by a laser radar may further include a laser pulse signal emitted by a remaining laser radar. As a result, the laser radar cannot correctly identify which signal is an echo signal returned when a laser pulse encounters a target object, thereby causing an anomaly in a ranging result of the laser radar and mutual interference between a plurality of radars.

SUMMARY

In view of this, embodiments of this application provide a multi-pulse anti-interference signal processing method and apparatus, to resolve a problem in a conventional technical solution that a false echo signal exists during ranging of an ultrasonic radar, thereby causing a high signal-to-noise ratio of a target echo signal, and mutual interference between a plurality of radars.

A first aspect of the embodiments of this application provides a multi-pulse anti-interference signal processing method. The multi-pulse anti-interference signal processing method includes:
  sending a plurality of detection pulses to a detection target within a detection cycle, where a time interval between the plurality of detection pulses is a preset time;
  capturing a plurality of echo pulses generated by reflecting the plurality of detection pulses at the detection target;
  delaying the plurality of echo pulses by the preset time to obtain a plurality of delayed echo pulses; and
  obtaining a target echo pulse based on the plurality of echo pulses and the plurality of delayed echo pulses.

A second aspect of the embodiments of this application provides a multi-pulse anti-interference signal processing apparatus. The multi-pulse anti-interference signal processing apparatus includes:
  a detection pulse sending module, configured to send a plurality of detection pulses to a detection target within a detection cycle, where a time interval between the plurality of detection pulses is a preset time;
  an echo pulse capture module, configured to capture a plurality of echo pulses generated by reflecting the plurality of detection pulses at the detection target;
  a delayed echo pulse obtaining module, configured to delay the plurality of echo pulses by the preset time to obtain a plurality of delayed echo pulses; and
  a target echo pulse obtaining module, configured to obtain a target echo pulse based on the plurality of echo pulses and the plurality of delayed echo pulses.

A third aspect of the embodiments of this application provides a multi-pulse anti-interference signal processing apparatus, including a memory, a processor, and a computer program that is stored in the memory and capable of running on the processor. When executing the computer program, the processor implements the steps of the foregoing multi-pulse anti-interference signal processing method.

In the embodiments of this application, the plurality of detection pulses are sent to the detection target within the preset time interval, the plurality of echo pulses obtained by reflecting the plurality of detection pulses at the detection target are captured and undergo analog-to-digital conversion, the plurality of echo pulses are delayed by the preset time to obtain the plurality of delayed echo pulses, and the target echo pulse is obtained based on the plurality of echo pulses and the plurality of delayed echo pulses. A false echo pulse resulting from optical-to-electrical conversion and an interfering echo pulse fed back by other radar are effectively eliminated. Therefore, a signal-to-noise ratio of a target echo pulse is increased, mutual interference between a plurality of radars is effectively eliminated, and accuracy of ranging performed by a radar by using a laser pulse is improved.

Based on the problem in the background, a fourth aspect of the embodiments of this application provides a laser radar system, including a laser emission unit and a laser receiving unit, where
  the laser emission unit is configured to emit at least two laser pulses to a target object based on a preset emission interval within a cycle; and
  the laser receiving unit is configured to receive a plurality of external signals within the cycle, obtain a reception interval between any two external signals, and determine, in the plurality of external signals based on the emission interval and the reception interval, an echo signal corresponding to the emitted laser pulses.

In an embodiment, the laser emission unit includes a first laser emitter and a laser delaying optical path, where
the first laser emitter is configured to emit a first emitting laser pulse; and
the laser delaying optical path is configured to receive the first emitting laser pulse, delay some lasers in the first emitting laser pulse, and output at least two laser pulses with an emission interval.

In an embodiment, the laser delaying optical path includes a laser splitting unit, a laser delaying unit, and a laser combination unit, where
the laser splitting unit is configured to split the first emitting laser pulse into a first laser pulse and a second laser pulse, send the first laser pulse to the laser delaying unit, and send the second laser pulse to the laser combination unit;
the laser delaying unit is configured to delay the received first laser pulse to obtain a third laser pulse, where there is an emission interval between the third laser pulse and the second laser pulse; and
the laser combination unit is configured to emit the received second laser pulse and third laser pulse to the target object.

In an embodiment, the laser splitting unit is a first polarizing splitter, and the laser combination unit is a second polarizing splitter, where
the first polarizing splitter is configured to split the first emitting laser pulse into an S-polarization first laser pulse and a P-polarization second laser pulse, send the S-polarization first laser pulse to the laser delaying unit, and transmit the P-polarization second laser pulse to the second polarizing splitter; and
the second polarizing splitter is configured to receive the P-polarization second laser pulse and output the P-polarization second laser pulse through transmission, and receive an S-polarization third laser pulse and output the third laser pulse through reflection.

In an embodiment, the laser delaying unit includes a first total reflection prism and a second total reflection prism, where
the first total reflection prism is configured to reflect the first laser pulse to the second total reflection prism; and
the second total reflection prism is configured to reflect the received laser pulse to the second polarizing splitter.

In an embodiment, a distance of an optical path formed by an element in the laser delaying unit and an element in the laser splitting unit is adjustable, and a length of the distance is related to duration of the emission interval.

In an embodiment, the first laser emitter is configured to emit at least two laser pulses to the laser delaying optical path based on a preset emission interval within a cycle.

In an embodiment, the laser emission unit includes a second laser emitter, a third laser emitter, and a laser combination optical path, where
the second laser emitter and the third laser emitter emit a second emitting laser pulse and a third emitting laser pulse within the cycle; and
the laser combination optical path is configured to combine the second emitting laser pulse and the third emitting laser pulse, and emit a combined laser pulse to the target object.

In an embodiment, an emission interval for emitting a laser pulse by the second laser emitter and the third laser emitter is adjustable.

In an embodiment, the second emitting laser pulse is of S polarization, the third emitting laser pulse is of P polarization, and the laser combination optical path includes a third polarized splitter and a third total reflection prism, where
the third total reflection prism is configured to reflect the second emitting laser pulse to the third polarizing splitter; and
the third polarizing splitter is configured to output, through reflection, the laser pulse sent by the third total reflection prism, and output the third emitting laser pulse through transmission.

A laser radar echo signal determining method is applied to the foregoing laser radar system, and the laser radar system includes a laser emission unit and a laser receiving unit, where
the laser emission unit emits at least two laser pulses to a target object based on a preset emission interval within a cycle; and
the laser receiving unit receives a plurality of external signals within the cycle, obtains a reception interval between any two external signals, and determines, in the plurality of external signals based on the emission interval and the reception interval, an echo signal corresponding to the emitted laser pulses.

The laser emission unit sends the at least two laser pulses based on the preset emission interval within the cycle. In this case, after the at least two laser pulses encounter the same target object, a reception interval between at least two echo signals that are returned matches the emission interval, and an interval between interfering signals received by a receiving circuit does not match the emission interval. Therefore, the laser receiving unit may determine the echo signals based on the emission interval and the reception interval, so that an anomaly in a ranging result can be avoided in the laser radar system, and an anti-interference capability of the laser radar system can be improved.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following descriptions show only some embodiments of this application, and a person of ordinary skill in the art may still derive other drawings from these accompanying drawings without creative efforts.

BRIEF DESCRIPTION OF DRAWINGS 10. laser emission unit; 20. laser receiving unit; 11. first laser emitter;
12. laser delaying optical path; 121. laser splitting unit; 122. laser delaying unit;
123. laser combination unit; 1211. first polarizing splitter; 1231. second polarizing splitter;
1221. first total reflection prism; 1222. second total reflection prism; 13. second laser emitter;
14. third laser emitter; 15. laser combination optical path; 151. third polarizing splitter;
152. third total reflection prism.

DESCRIPTION OF EMBODIMENTS

To make the objectives, technical solutions, and advantages of this application clearer, the following further describes this application in detail with reference to the accompanying drawings and the embodiments. It should be understood that the specific embodiments described herein are only intended to interpret this application, but not to limit this application. It should be noted that the embodiments of this application and the features in the embodiments may be combined with one another, provided that there is no conflict.

The following descriptions illustrate many specific details to fully understand this application. However, this application may also be implemented in another manner different from a manner described herein. Therefore, the protection scope of this application is not limited by the specific embodiments disclosed below.

Figure 1:
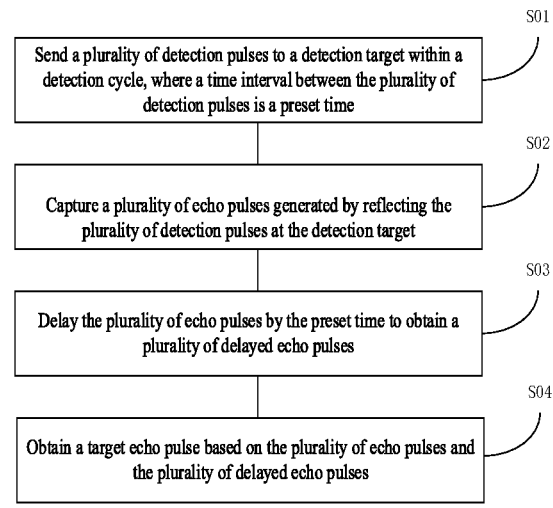
FIG. 1 is a schematic flowchart of a multi-pulse anti-interference signal processing method according to an embodiment of this application.

FIG. 1 is a schematic flowchart of a multi-pulse anti-interference signal processing method according to an embodiment of this application. For ease of description, only the relevant parts of this embodiment are shown. Details are described as follows.

A first aspect of the embodiments of this application provides a multi-pulse anti-interference signal processing method, including the following steps:

Step S01: Send a plurality of detection pulses to a detection target within a detection cycle, where a time interval between the plurality of detection pulses is a preset time.

In a specific implementation, a radar emitter is an emission apparatus of the plurality of detection pulses, and a semiconductor laser that controls the emitter emits at least one laser pulse within the detection cycle. The time interval between the plurality of detection pulses emitted by the emitter may be freely set, for example, the time interval is preset to be T, so as to form a coding system for a pulse light source in time domain.

Step S02: Capture a plurality of echo pulses generated by reflecting the plurality of detection pulses at the detection target. Step S02 is specifically to: capture and perform analog-to-digital conversion on the plurality of echo pulses generated by reflecting the plurality of detection pulses at the detection target.

Step S03: Delay the plurality of echo pulses by the preset time to obtain a plurality of delayed echo pulses.

Step S04: Obtain a target echo pulse based on the plurality of echo pulses and the plurality of delayed echo pulses.

Figure 2:
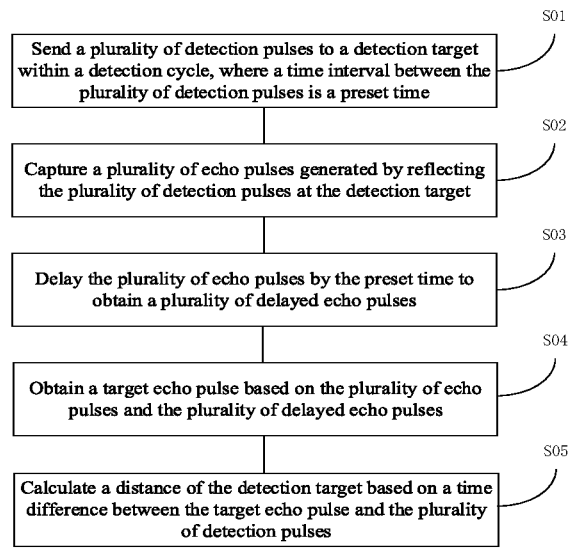
FIG. 2 is another schematic flowchart of a multi-pulse anti-interference signal processing method according to an embodiment of this application.

Referring to FIG. 2, in an embodiment, after step S04, the method further includes the following step:

Step S05: Calculate a distance of the detection target based on a time difference between the target echo pulse and the plurality of detection pulses.

The target echo pulse with a high signal-to-noise ratio is obtained through step S01 to S04. Further, the distance of the detection target is determined based on the target echo pulse with the high signal-to-noise ratio in step S05. This improves accuracy of measuring a distance of a target detection object by a radar by using a laser pulse, eliminates mutual interference between radars when a plurality of radars are used for ranging, and improves performance of a radar and accuracy of ranging performed by the radar by using a laser pulse.

Figure 3:
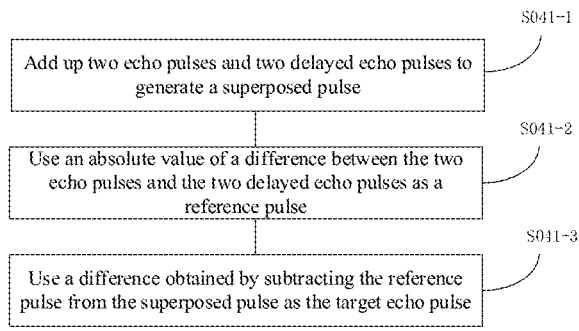
FIG. 3 is another schematic flowchart of a multi-pulse anti-interference signal processing method according to an embodiment of this application.

Referring to FIG. 3, in an embodiment, the plurality of detection pulses are two detection pulses, the plurality of echo pulses are two echo pulses, and the delaying of the plurality of echo pulses by the preset time to obtain a plurality of delayed echo pulses in step S03 is specifically:

delaying the two echo pulses based on the preset time to obtain two delayed echo pulses.

The obtaining of a target echo pulse based on the plurality of echo pulses and the plurality of delayed echo pulses in step S04 includes the following steps:

Step S041-1: Add up the two echo pulses and the two delayed echo pulses to generate a superposed pulse.

Step S041-2: Use an absolute value of a difference between the two echo pulses and the two delayed echo pulses as a reference pulse.

Step S041-3: Use a difference obtained by subtracting the reference pulse from the superposed pulse as the target echo pulse.

Figure 4:
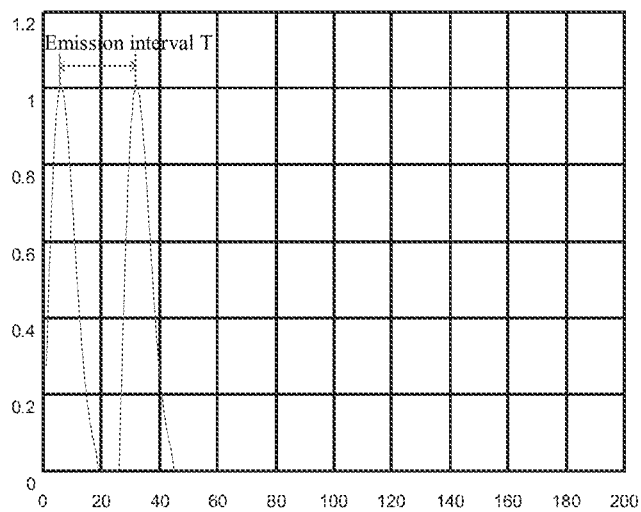
FIG. 4 is a waveform diagram of two detection pulses in a multi-pulse anti-interference signal processing method provided in FIG. 3.
Figure 5:
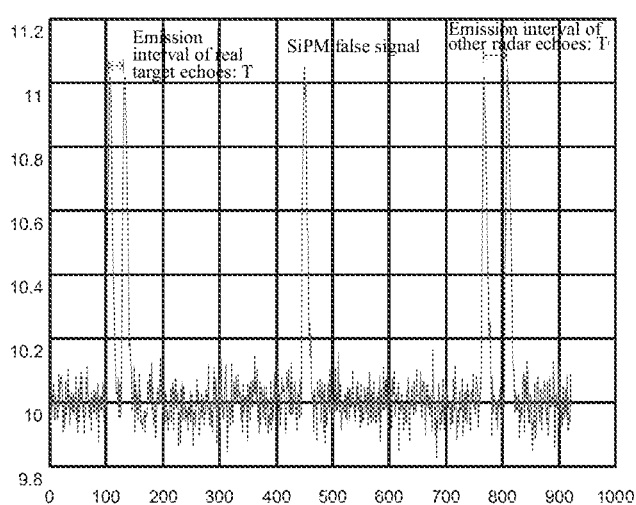
FIG. 5 is a waveform diagram of two echo pulses in a multi-pulse anti-interference signal processing method provided in FIG. 3.
Figure 6:
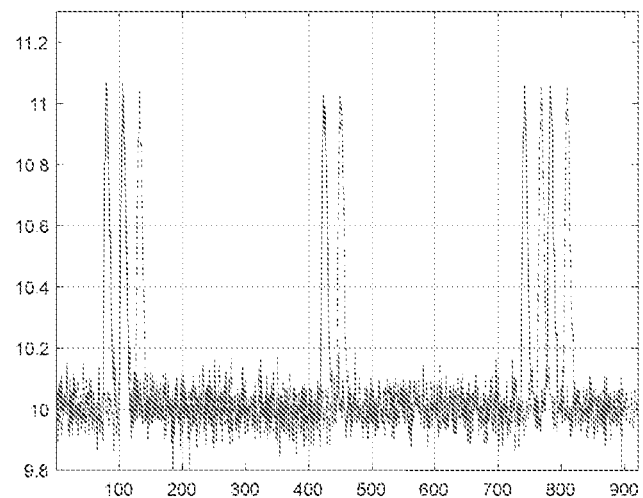
FIG. 6 is a waveform diagram of two delayed echo pulses in a multi-pulse anti-interference signal processing method provided in FIG. 3.
Figure 7:
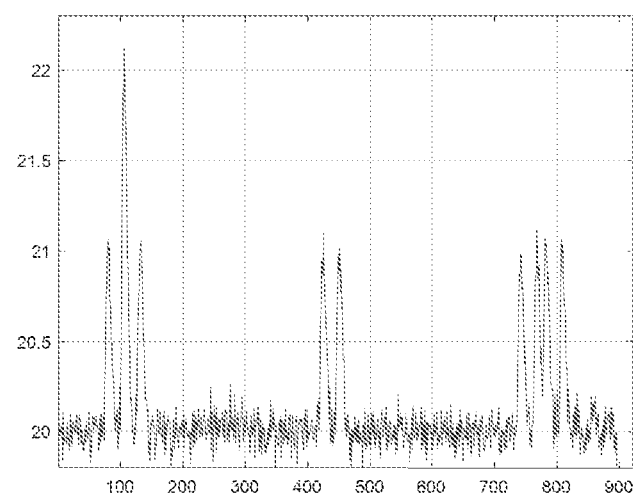
FIG. 7 is a waveform diagram of a superposed pulse in a multi-pulse anti-interference signal processing method provided in FIG. 3.
Figure 8:
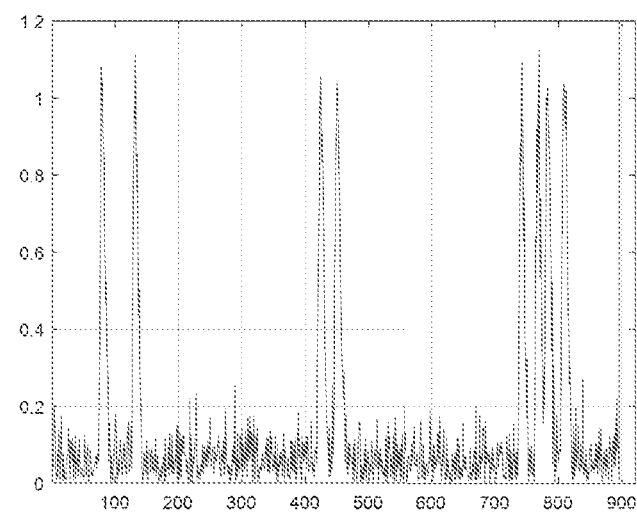
FIG. 8 is a waveform diagram of a reference pulse in a multi-pulse anti-interference signal processing method provided in FIG. 3.
Figure 9:
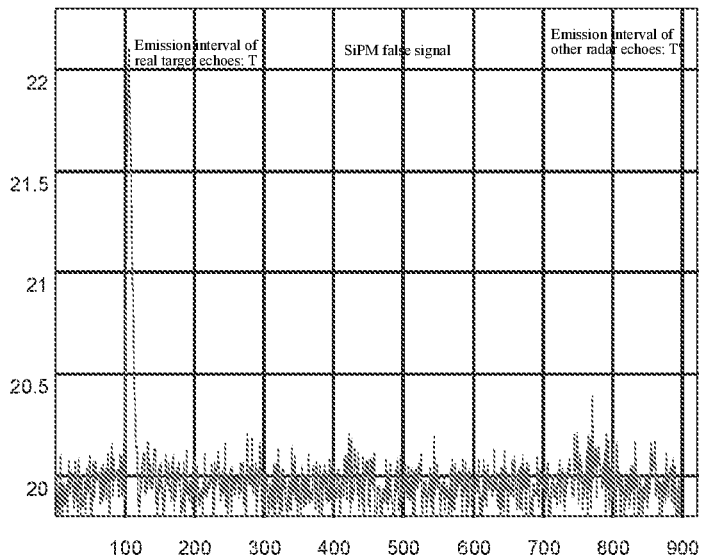
FIG. 9 is a waveform diagram of a target echo pulse in a multi-pulse anti-interference signal processing apparatus provided in FIG. 3.

In a specific implementation, referring to FIG. 4 to FIG. 9, in the radar emitter, the preset time is set to T, and the two detection pulses are sent to the detection target based on the preset time interval T, as shown in FIG. 4. After certain spatial propagation, a radar receiver captures the two echo pulses generated by reflecting the two detection pulses at the detection target. Assuming that the two echo pulses captured by the radar receiver include a real target echo pulse, a false echo pulse generated by a SiPM, and echo pulses with a time interval of T' that are reflected by the detection target for other radars, with superposition of a Gaussian noise, the echo pulses are shown in FIG. 5. It is known that the time interval between the two detection pulses sent by the radar emitter is T, the two echo pulses are denoted as A, and the two delayed echo pulses obtained by performing delaying based on the time interval T are denoted as B, as shown in FIG. 6. Solid lines in FIG. 6 indicate the two echo pulses A. Dashed lines in FIG. 6 indicate the two delayed echo pulses B. The two echo pulses A and the two delayed echo pulses B are added up, (A+B), to obtain the superposed pulse, as shown in FIG. 7. The absolute value of the difference between the two echo pulses A and the two delayed echo pulses B, |A−B|, is used as the reference pulse, as shown in FIG. 8. The difference obtained by subtracting the reference pulse |A−B| from the superposed pulse (A+B), (A+B)−|A−B|, is used as the target echo pulse, as shown in FIG. 9. It can be seen that, there are only the two echo pulses A that are superposed in FIG. 9. The two superposed pulses A are the target echo pulses, and amplitude of the target echo pulse is a sum of amplitudes of the two echo pulses A. The false echo pulse generated by the SiPM and the echo pulses with the time interval of T' that are reflected by the detection target for the other radars are completely eliminated.

In this embodiment of this application, the two echo pulses of the two detection pulses emitted at preset time interval correspondingly reflected by the detection target are captured and analog-to-digital conversion is performed; and analog-to-digital conversion is performed on the two echo pulses by delaying based on the preset time to obtain two delayed echo pulses; the two echo pulses and the two delayed echo pulses are added up to obtain the superposed pulse; the two delayed echo pulses are subtracted from the two echo pulses, and the absolute value is calculated to obtain the reference pulse; and then the target echo pulse is obtained based on the difference between the superposed pulse and the reference pulse. Since the false echo pulse generated by the SiPM and mutually interfering echo pulses fed back between a plurality of radars are effectively eliminated, the signal-to-noise ratio of the target echo pulse is thereby improved, eliminating mutual interference when a plurality of radars are used for ranging.

Figure 10:
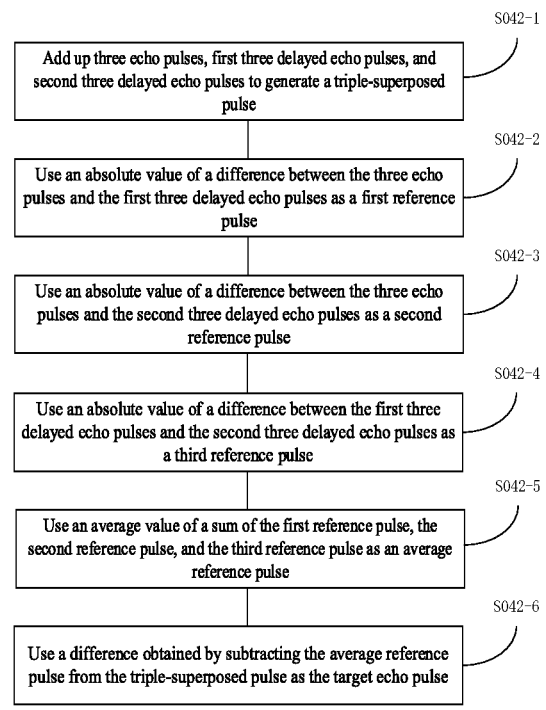
FIG. 10 is another schematic flowchart of a multi-pulse anti-interference signal processing method according to an embodiment of this application.

Referring to FIG. 10, in an embodiment, the plurality of detection pulses are three detection pulses, the plurality of echo pulses are three echo pulses, and the delaying the plurality of echo pulses by the preset time to obtain a plurality of delayed echo pulses in step S03 is specifically:

delaying the three echo pulses based on a first preset time to obtain first three delayed echo pulses, and delaying the three echo pulses based on a second preset time to obtain second three delayed echo pulses.

The obtaining of a target echo pulse based on the plurality of echo pulses and the plurality of delayed echo pulses in step S04 includes the following steps:

Step S042-1: Add up the three echo pulses, the first three delayed echo pulses, and the second three delayed echo pulses to generate a triple-superposed pulse.

Step S042-2: Use an absolute value of a difference between the three echo pulses and the first three delayed echo pulses as a first reference pulse.

Step S042-3: Use an absolute value of a difference between the three echo pulses and the second three delayed echo pulses as a second reference pulse.

Step S042-4: Use an absolute value of a difference between the first three delayed echo pulses and the second three delayed echo pulses as a third reference pulse.

Step S042-5: Use an average value of a sum of the first reference pulse, the second reference pulse, and the third reference pulse as an average reference pulse.

Step S042-6: Use a difference obtained by subtracting the average reference pulse from the triple-superposed pulse as the target echo pulse.

Figure 11:
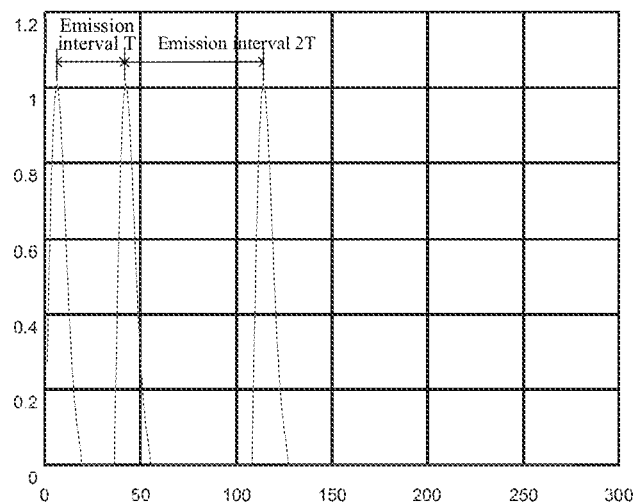
FIG. 11 is a waveform diagram of three detection pulses in a multi-pulse anti-interference signal processing method provided in FIG. 10.
Figure 12:
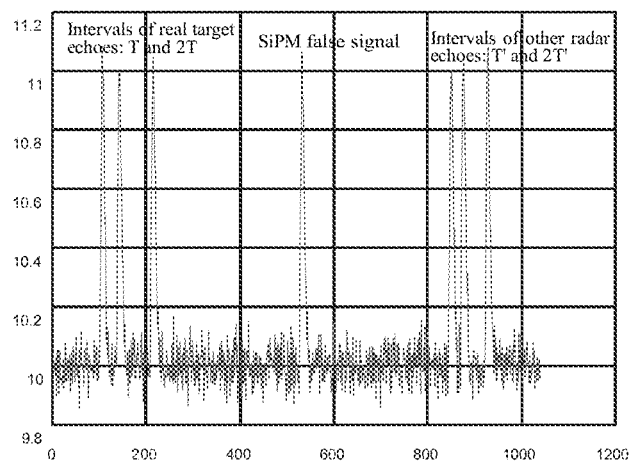
FIG. 12 is a waveform diagram of two three echo pulses in a multi-pulse anti-interference signal processing method provided in FIG. 10.
Figure 13:
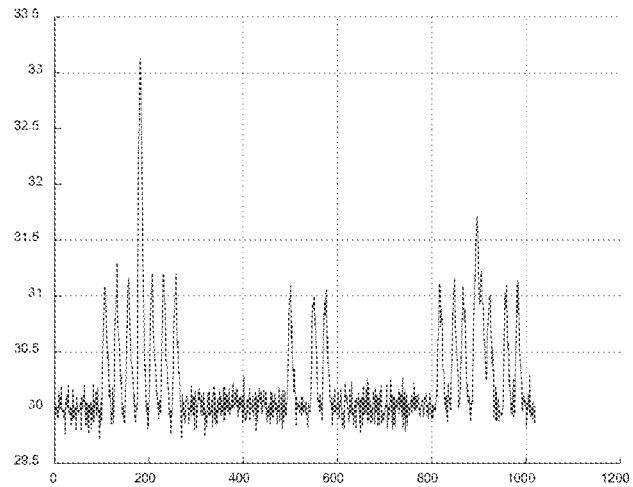
FIG. 13 is a waveform diagram of a triple-superposed pulse in a multi-pulse anti-interference signal processing method provided in FIG. 10.
Figure 14:
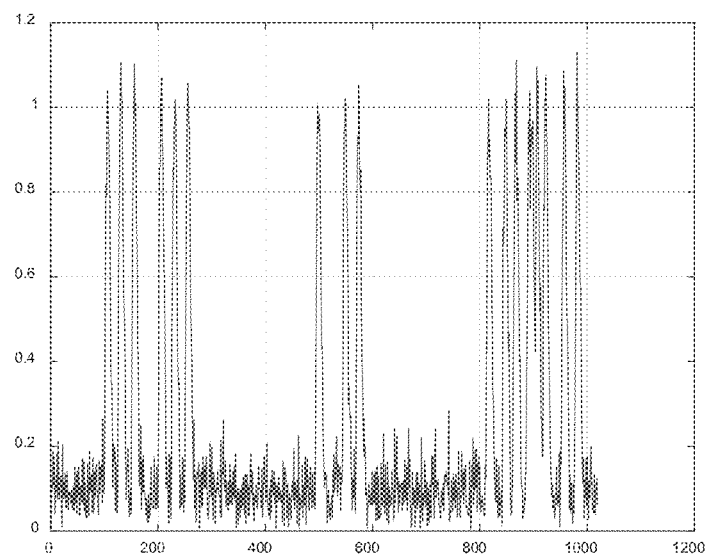
FIG. 14 is a waveform diagram of an average reference pulse in a multi-pulse anti-interference signal processing method provided in FIG. 10.
Figure 15:
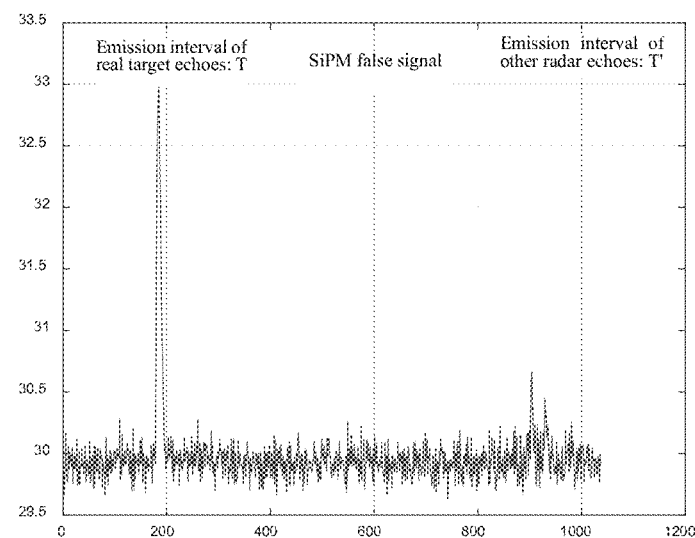
FIG. 15 is a waveform diagram of a target echo pulse in a multi-pulse anti-interference signal processing apparatus provided in FIG. 10.

In a specific implementation, referring to FIG. 11 to FIG. 15, in the radar emitter, the preset time is set to T, and laser pulses are emitted to the detection target based on the preset time interval T. FIG. 11 shows a waveform of the three detection pulses emitted by the radar emitter. After certain spatial propagation, a radar receiver captures the three echo pulses generated by reflecting the three detection pulses at the detection target. Assuming that the three echo pulses captured by the radar include a real target echo pulse, a false echo pulse generated by a SiPM, and echo pulses with a time interval of T' that are reflected by the detection target for other radars, with superposition of a Gaussian noise, the three echo pulses are shown in FIG. 12. It is known that time intervals between the three detection pulses sent by the radar emitter are T and 2T, the three echo pulses are denoted as A, the first three delayed echo pulses obtained by performing delaying based on the first preset time 2T are denoted as B, and the second three delayed echo pulses obtained by performing delaying based on the second preset time 3T are denoted as C. The three echo pulses A, the first three delayed echo pulses B and the second three delayed echo pulses C are added up, (A+B+C), to obtain the triple-superposed pulse D, as shown in FIG. 13. The absolute value of the difference between the three echo pulses A and the first three delayed echo pulses B, |A−B|, is used as the first reference pulse; the absolute value of the difference between the three echo pulses A and the second three delayed echo pulses C, |A−C|, is used as the second reference pulse; the absolute value of the difference between the first three delayed echo pulses B and the second three delayed echo pulses C, |B−C|, is used as the third reference pulse; the average value of the sum of the first reference pulse |A−B|, the second reference pulse |A−C|, and the third reference pulse |B−C|, [(|A−B|+|A−C|+|B−C|)]/2, is used as the average reference pulse E, as shown in FIG. 14. The difference obtained by subtracting the average reference pulse E from the triple-superposed pulse D, D−E, is used as the target echo pulse, that is, the target echo pulse is obtained by (A+B+C)−[(|A−B|+|A−C|+|B−C|)]/2, as shown in FIG. 15. It can be seen that, there is only a real echo signal obtained through superposition and amplification in FIG. 15. The false echo pulse generated by the SiPM and the echo pulses with the time interval of T' that are reflected by the detection target for the other radars are completely eliminated. The false echo pulse generated by the SiPM and interfering echo pulses fed back between a plurality of radars are effectively eliminated, thereby increasing a signal-to-noise ratio of the target echo pulse, and eliminating mutual interference when a plurality of radars are used for ranging.

Figure 16:
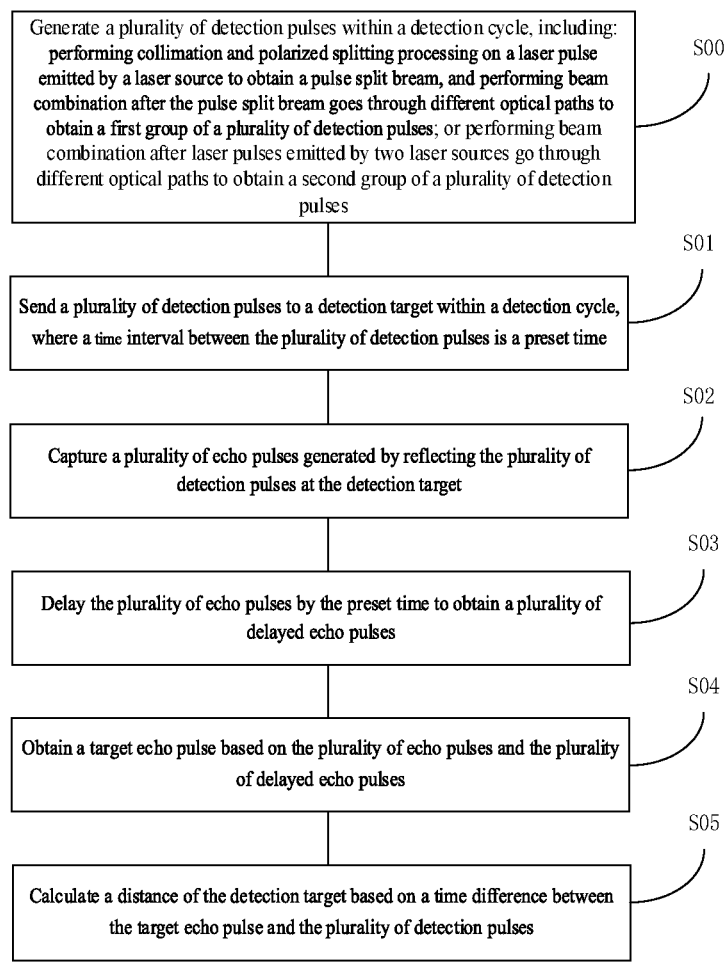
FIG. 16 is another schematic flowchart of a multi-pulse anti-interference signal processing method according to an embodiment of this application.

Referring to FIG. 16, in an embodiment, before sending a plurality of detection pulses to a detection target within a detection cycle, where a time interval between the plurality of detection pulses is a preset time in step S01, the method further includes the following step:

Step S00: Generate a plurality of detection pulses within a detection cycle.

The generating of a plurality of detection pulses within a detection cycle in step S00 includes the following steps:

Step S01-A: Perform collimation and polarized splitting processing on a laser pulse emitted by a laser source to obtain a pulse split bream, and perform beam combination after the pulse split bream goes through different optical paths to obtain a first group of a plurality of detection pulses. Or Step S01-B: Perform beam combination after laser pulses emitted by two laser sources go through different optical paths to obtain a second group of a plurality of detection pulses.

Figure 17:
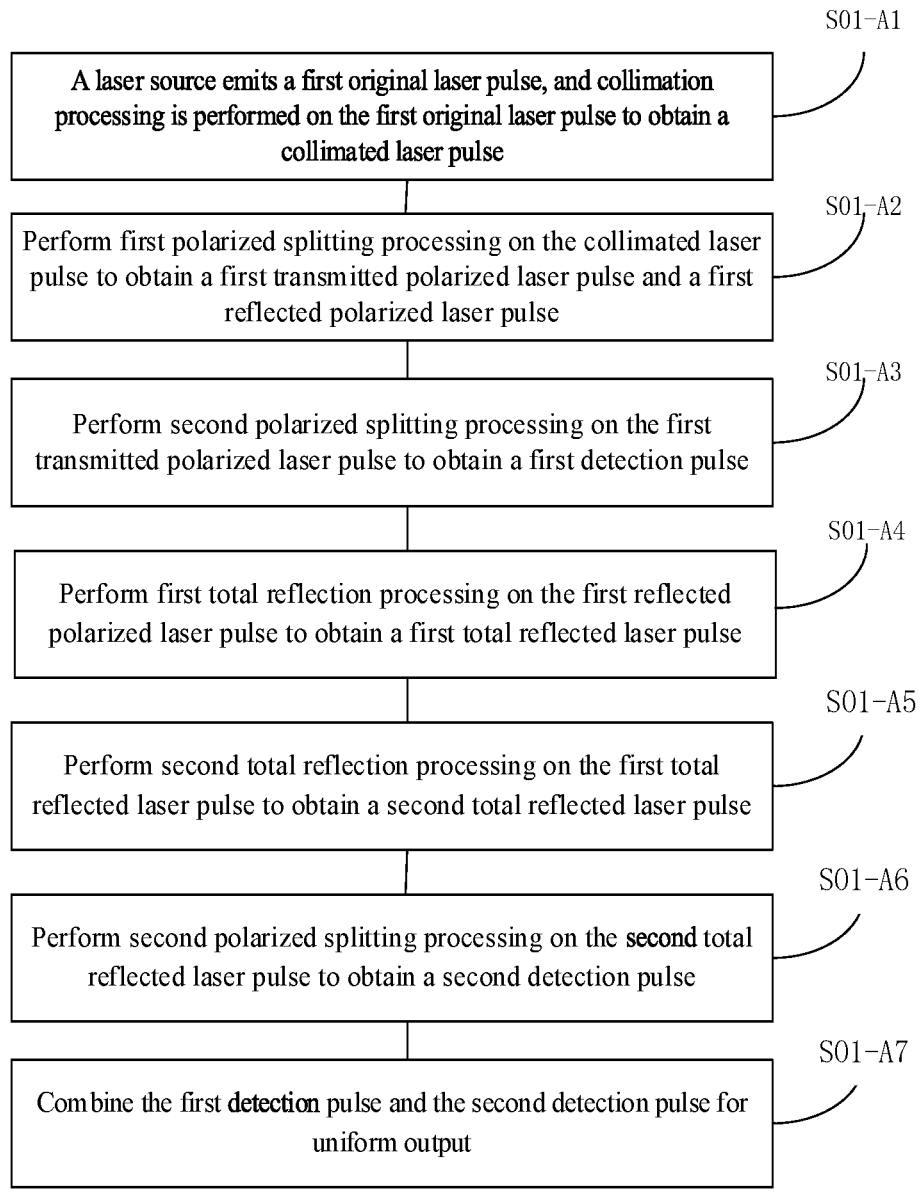
FIG. 17 is a schematic flowchart of generating a plurality of detection pulses according to an embodiment of this application.

Referring to FIG. 17, in an embodiment, the performing collimation and polarized splitting processing on a laser pulse emitted by a laser source to obtain a pulse split bream, and performing beam combination after the pulse split bream goes through different optical paths to obtain a first group of a plurality of detection pulses in step S01-A includes the following steps:

Step S01-A1: The laser source emits a first original laser pulse, and collimation processing is performed on the first original laser pulse to obtain a collimated laser pulse.

Step S01-A2: Perform first polarized splitting processing on the collimated laser pulse to obtain a first transmitted polarized laser pulse and a first reflected polarized laser pulse.

Step S01-A3: Perform second polarized splitting processing on the first transmitted polarized laser pulse to obtain a first detection pulse.

Step S01-A4: Perform first total reflection processing on the first reflected polarized laser pulse to obtain a first total reflected laser pulse.

Step S01-A5: Perform second total reflection processing on the first total reflected laser pulse to obtain a second total reflected laser pulse.

Step S01-A6: Perform second polarized splitting processing on the second total reflected laser pulse to obtain a second detection pulse.

Step S01-A7: Combine the first detection pulse and the second detection pulse for uniform output.

In a specific implementation, the first detection pulse and the second detection pulse are combined into one beam for output. A propagation distance of a first reflected polarized laser pulse that generates the second detection pulse is greater than that of a first transmitted polarized laser pulse that generates the first detection pulse. Therefore, there is a time delay between the second detection pulse and the first detection pulse, and a delay time may be preset, to implement a design in which a time delay reaches a nanosecond (ns)-order-of-magnitude or even a picosecond (ps)-order-of-magnitude.

Optionally, a light source may alternatively emit two or more first original laser pulses, and by setting a time interval between the emitted original laser pulses, and adjusting a distance between first polarized splitting and first total reflection, and a distance between second polarized splitting and second total reflection, the pulses of these two paths appear alternately to generate two or more detection pulses with a specific time interval.

Figure 18:
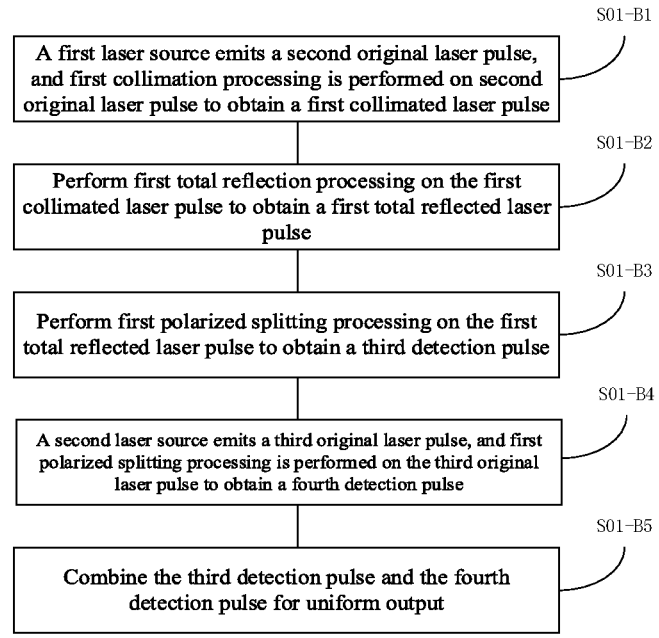
FIG. 18 is another schematic flowchart of generating a plurality of detection pulses according to an embodiment of this application.

Referring to FIG. 18, in an embodiment, the performing beam combination after laser pulses emitted by two laser sources go through different optical paths to obtain a second group of a plurality of detection pulses in step S01-B includes the following steps:

Step S01-B1: A first laser source emits a second original laser pulse, and first collimation processing is performed on second original laser pulse to obtain a first collimated laser pulse.

Step S01-B2: Perform first total reflection processing on the first collimated laser pulse to obtain a first total reflected laser pulse.

Step S01-B3: Perform first polarized splitting processing on the first total reflected laser pulse to obtain a third detection pulse.

Step S01-B4: A second laser source emits a third original laser pulse, and first polarized splitting processing is performed on the third original laser pulse to obtain a fourth detection pulse.

Step S01-B5: Combine the third detection pulse and the fourth detection pulse for uniform output.

In a specific implementation, the second original laser pulse may be emitted by a first light source, and the third original laser pulse may be emitted by a second light source. The two light sources are separately controlled to emit laser pulses. This not only can implement a design in which a time delay reaches a nanosecond-order-of-magnitude or even a picosecond-order-of-magnitude, but also achieves a better controllability characteristic. In addition, a time delay between a start time of the third original laser pulse emitted by the second light source and a start time of the second original laser pulse emitted by the first light source may be freely set. Therefore, there is a certain time jitter between the third detection pulse and the fourth detection pulse. In a pulse time sequence of a combined beam that is output, both a delay time and a jitter time may be freely controlled, so that a time jitter may exist between a plurality of pulses that are combined. Each set of laser radar has an intrinsic time jitter feature. This feature is a special identifier of a radar, and may be distinguished from a pulse feature of another laser radar, to resist interference between different laser radars.

Figure 19:
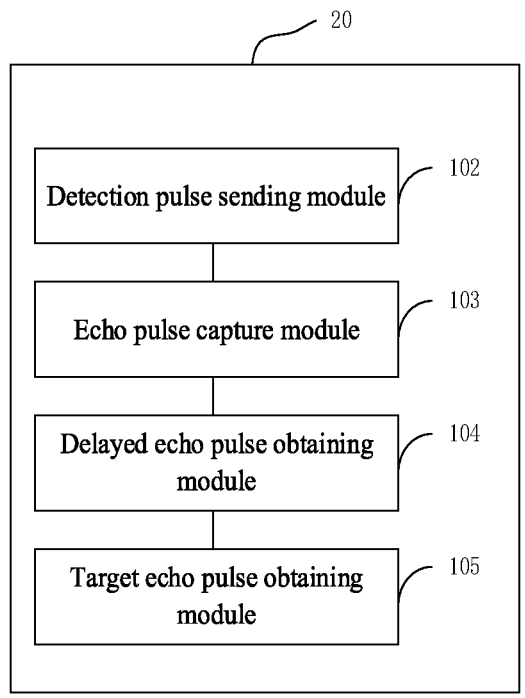
FIG. 19 is a schematic structural diagram of a multi-pulse anti-interference signal processing apparatus according to an embodiment of this application.

Referring to FIG. 19, to implement the foregoing multi-pulse anti-interference signal processing method, an embodiment of this application provides a multi-pulse anti-interference signal processing apparatus 20. The multi-pulse anti-interference signal processing apparatus 20 includes a detection pulse sending module 102, an echo pulse capture module 103, a delayed echo pulse obtaining module 104, and a target echo pulse obtaining module 105.

The detection pulse sending module 102 is configured to send a plurality of detection pulses to a detection target within a detection cycle, where a time interval between the plurality of detection pulses is a preset time.

The echo pulse capture module 103 is configured to capture a plurality of echo pulses generated by reflecting the plurality of detection pulses at the detection target. In a specific implementation, the echo pulse capture module 103 captures and performs analog-to-digital conversion on the plurality of echo pulses generated by reflecting the plurality of detection pulses at the detection target.

The delayed echo pulse obtaining module 104 is configured to delay the plurality of echo pulses by the preset time to obtain a plurality of delayed echo pulses.

The target echo pulse obtaining module 105 is configured to obtain a target echo pulse based on the plurality of echo pulses and the plurality of delayed echo pulses.

Figure 20:
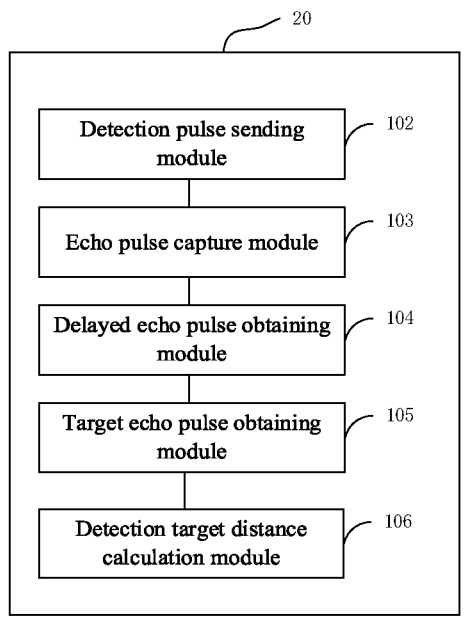
FIG. 20 is another schematic structural diagram of a multi-pulse anti-interference signal processing apparatus according to an embodiment of this application.

Referring to FIG. 20, in an embodiment, the multi-pulse anti-interference signal processing apparatus 20 further includes a detection target distance calculation module 106.

The detection target distance calculation module 106 is configured to calculate a distance of the detection target based on a time difference between the target echo pulse and the plurality of detection pulses.

According to the laser radar ranging principle, the distance of the detection target is calculated based on the time difference between reception of the target echo pulse and transmission of the plurality of detection pulses, and the target echo pulse with a high signal-to-noise ratio is obtained, thereby improving accuracy of measuring a distance of a target detection object by a radar by using a laser pulse, and effectively eliminating mutual interference between radars when a plurality of radars are used for ranging.

Figure 21:
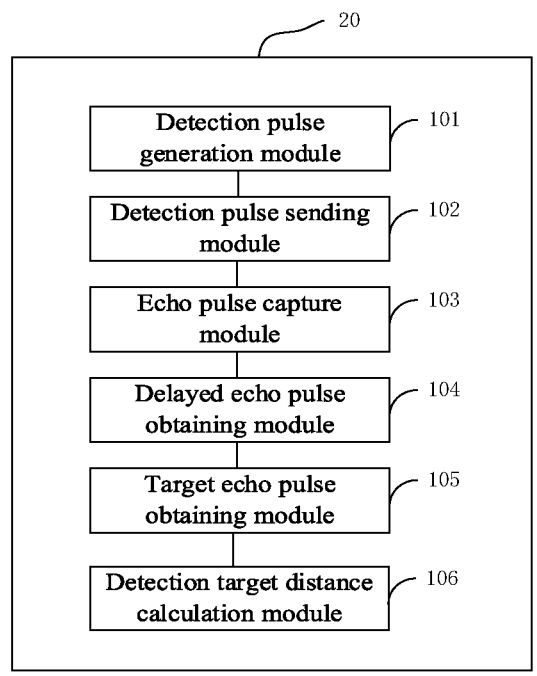
FIG. 21 is another schematic structural diagram of a multi-pulse anti-interference signal processing apparatus according to an embodiment of this application.

Referring to FIG. 21, in an embodiment, the multi-pulse anti-interference signal processing apparatus 20 further includes a detection pulse generation module 101.

The detection pulse generation module 101 is configured to generate a plurality of detection pulses within a detection cycle.

In a specific implementation, the detection pulse generation module 101 is disposed in a laser emitter. In the laser emitter, the time interval between the plurality of detection pulses is preset to T, and the plurality of detection pulses are sent to the detection target based on the preset time interval T. Optionally, different time intervals are preset for different emitters.

Figure 22:
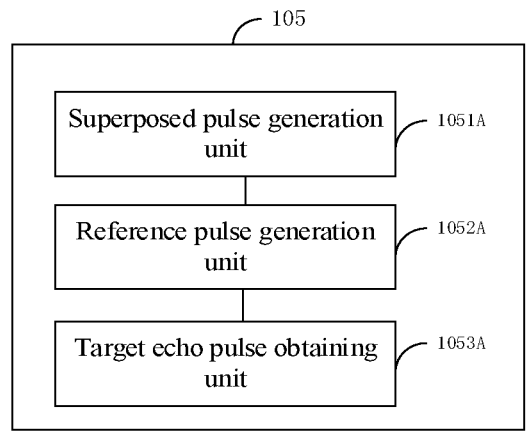
FIG. 22 is a schematic structural diagram of a target echo pulse obtaining module in a multi-pulse anti-interference signal processing apparatus according to an embodiment of this application.

Referring to FIG. 22, in an embodiment, the plurality of detection pulses are two detection pulses, the plurality of echo pulses are two echo pulses, and the target echo pulse obtaining module 105 includes a superposed pulse generation unit 1051A, a reference pulse generation unit 1052A, and a target echo pulse obtaining unit 1053A.

The superposed pulse generation unit 1051A is configured to add up the two echo pulses and the two delayed echo pulses to generate a superposed pulse.

The reference pulse generation unit 1052A is configured to use an absolute value of a difference between the two echo pulses and the two delayed echo pulses as a reference pulse.

The target echo pulse obtaining unit 1053A is configured to use a difference obtained by subtracting the reference pulse from the superposed pulse as the target echo pulse.

In this embodiment of this application, the superposed pulse generation unit adds up the two echo pulses and the two delayed echo pulses to obtain the superposed pulse; the reference pulse generation unit calculates the difference between the two echo pulses and the two delayed echo pulses and the absolute value to obtain the reference pulse; and then the target echo pulse obtaining unit calculates the difference based on the superposed pulse and the reference pulse to obtain the target echo pulse. The target echo pulse is obtained based on the two echo pulses generated by reflecting the two detection pulses by the detection target, and based on the two delayed echo pulses obtained by performing analog-to-digital conversion on the two echo pulses by delaying based on the preset time. A generated false echo pulse and interfering echo pulses fed back between a plurality of radars are effectively eliminated, thereby increasing a signal-to-noise ratio of the target echo pulse, and eliminating mutual interference when a plurality of radars are used for ranging.

Figure 23:
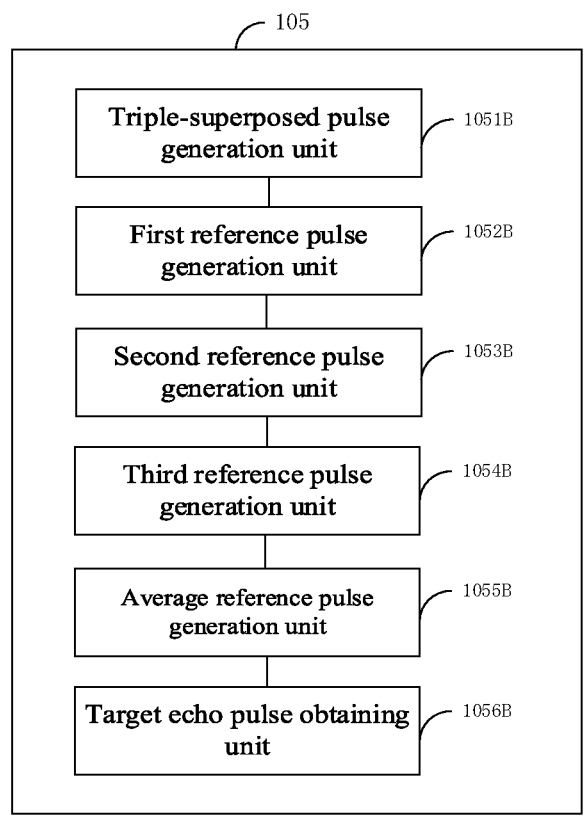
FIG. 23 is another schematic structural diagram of a target echo pulse obtaining module in a multi-pulse anti-interference signal processing apparatus according to an embodiment of this application.

Referring to FIG. 23, in an embodiment, the plurality of detection pulses are three detection pulses, the plurality of echo pulses are three echo pulses, and the delayed echo pulse obtaining module 104 is specifically configured to delay the three echo pulses based on a first preset time to obtain first three delayed echo pulses, and delay the three echo pulses based on a second preset time to obtain second three delayed echo pulses. The target echo pulse obtaining module 105 includes a triple-superposed pulse generation unit 1051B, a first reference pulse generation unit 1052B, a second reference pulse generation unit 1053B, a third reference pulse generation unit 1054B, an average reference pulse generation unit 1055B, and a target echo pulse obtaining unit 1056B.

The triple-superposed pulse generation unit 1051B is configured to add up the three echo pulses, the first three delayed echo pulses, and the second three delayed echo pulses to generate a triple-superposed pulse.

The first reference pulse generation unit 1052B is configured to use an absolute value of a difference between the three echo pulses and the first three delayed echo pulses as a first reference pulse.

The second reference pulse generation unit 1053B is configured to use an absolute value of a difference between the three echo pulses and the second three delayed echo pulses as a second reference pulse.

The third reference pulse generation unit 1054B is configured to use an absolute value of a difference between the first three delayed echo pulses and the second three delayed echo pulses as a third reference pulse.

The average reference pulse generation unit 1055B is configured to use an average value of a sum of the first reference pulse, the second reference pulse, and the third reference pulse as an average reference pulse.

The target echo pulse obtaining unit 1056B is configured to use a difference obtained by subtracting the average reference pulse from the triple-superposed pulse as the target echo pulse.

In this embodiment of this application, the target echo pulse is obtained based on the three echo pulses generated by reflecting the three detection pulses by the detection target, the first three delayed echo pulses obtained by performing analog-to-digital conversion on the three echo pulses by delaying by two preset times, and the second three delayed echo pulses obtained by performing analog-to-digital conversion on the three echo pulses by delaying by three preset times. A generated false echo pulse and interfering echo pulses fed back between a plurality of radars are effectively eliminated, thereby increasing a signal-to-noise ratio of the target echo pulse, and eliminating mutual interference when a plurality of radars are used for ranging.

Figure 24:
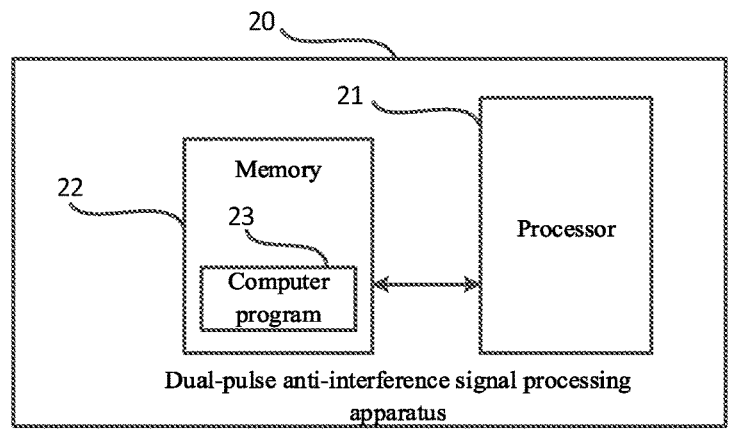
FIG. 24 is another schematic structural diagram of a multi-pulse anti-interference signal processing apparatus according to an embodiment of this application.

Referring to FIG. 24, FIG. 24 is another schematic diagram of a multi-pulse anti-interference signal processing apparatus 20 according to an embodiment of this application. As shown in FIG. 24, the multi-pulse anti-interference signal processing apparatus 20 according to an embodiment of this application includes a processor 21, a memory 22, and a computer program 23 that is stored in the memory 22 and capable of running on the processor 21, for example, a program of a multi-pulse anti-interference signal processing method. When executing the computer program 23, the processor 21 implements the steps in the foregoing multi-pulse anti-interference signal processing method embodiments, for example, steps S00 to S05 and steps S01-A1 to S01-A7, steps S01-B1 to S01-B5, steps S041-1 to S041-3, and steps S042-1 to S042-6 in FIG. 1 to FIG. 3, FIG. 10, and FIG. 16 to FIG. 18. Alternatively, when executing the computer program 23, the processor 21 implements the functions of the modules/units in the foregoing apparatus embodiments, for example, the functions of the modules 101 to 106, the units 1051A to 1053A, and the units 1051B to 1056B shown in FIG. 19 to FIG. 24.

For example, the computer program 23 may be divided into one or more modules/units, and the one or more modules/units are stored in the memory 22 and executed by the processor 21, to implement this application. The one or more modules/units may be a series of computer program instruction segments capable of performing specific functions. The instruction segment is used to describe an execution process of the computer program 23 in the multi-pulse anti-interference signal processing apparatus 20. For example, the computer program 23 may be divided to include a detection pulse sending module 102, an echo pulse capture module 103, a delayed echo pulse obtaining module 104, and a target echo pulse obtaining module 105.

The detection pulse sending module 102 is configured to send a plurality of detection pulses to a detection target within a detection cycle, where a time interval between the plurality of detection pulses is a preset time.

The echo pulse capture module 103 is configured to capture a plurality of echo pulses generated by reflecting the plurality of detection pulses at the detection target. In a specific implementation, the echo pulse capture module 103 captures and performs analog-to-digital conversion on the plurality of echo pulses generated by reflecting the plurality of detection pulses at the detection target.

The delayed echo pulse obtaining module 104 is configured to delay the plurality of echo pulses by the preset time to obtain a plurality of delayed echo pulses.

The target echo pulse obtaining module 105 is configured to obtain a target echo pulse based on the plurality of echo pulses and the plurality of delayed echo pulses.

A multi-pulse anti-interference signal processing apparatus 20 may be a radar or other detection device. The multi-pulse anti-interference signal processing apparatus 20 may include, but is not limited to, a processor 21 and a memory 22. A person skilled in the art can understand that FIG. 24 is only an example of the multi-pulse anti-interference signal processing apparatus 20, but does not constitute a limitation on the multi-pulse anti-interference signal processing apparatus 20. The multi-pulse anti-interference signal processing apparatus 20 may include more or fewer components than those shown in the figure, or some components may be combined, or there may be different components. For example, an associated application program mining apparatus may further include an input/output device, a network access device, or a bus, etc.

The processor 21 may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 22 may be an internal storage unit of the multi-pulse anti-interference signal processing apparatus 20, for example, a hard disk or an internal memory of the multi-pulse anti-interference signal processing apparatus 20. The memory 22 may be alternatively an external storage device of the multi-pulse anti-interference signal processing apparatus 20, for example, a plug-in hard disk, a smart media card (SMC), a secure digital (SD) card, or a flash card (Flash Card) disposed in the multi-pulse anti-interference signal processing apparatus 20. Further, the memory 22 may include both an internal storage unit and an external storage device of the multi-pulse anti-interference signal processing apparatus 20. The memory 22 is configured to store a computer program and another program and data that are necessary for the multi-pulse anti-interference signal processing apparatus 20. The memory 22 may be further configured to temporarily store data that has been output and is to be output.

A fourth aspect of the embodiments of this application provides a computer-readable storage medium. The computer-readable storage medium stores a computer program. When the computer program is executed by a processor, the steps of the foregoing multi-pulse anti-interference signal processing method are implemented.

Figure 25:
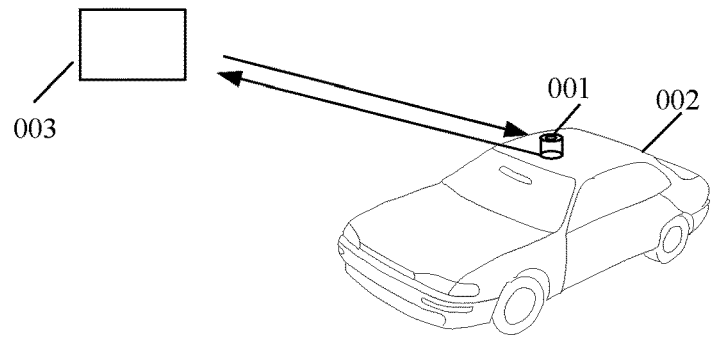
FIG. 25 is an application environment diagram of a laser radar system according to an embodiment.

A laser radar system provided in this application may be applied to an unmanned driving scenario, or other scenarios requiring a laser radar system. Using the unmanned driving scenario as an example, as shown in FIG. 25, a device 002 on which a laser radar is installed may detect a distance between a target object 003 and the device through the laser radar 001. The target object may be but is not limited to a road barrier, a vehicle, a pedestrian, and the like.

Figure 26:
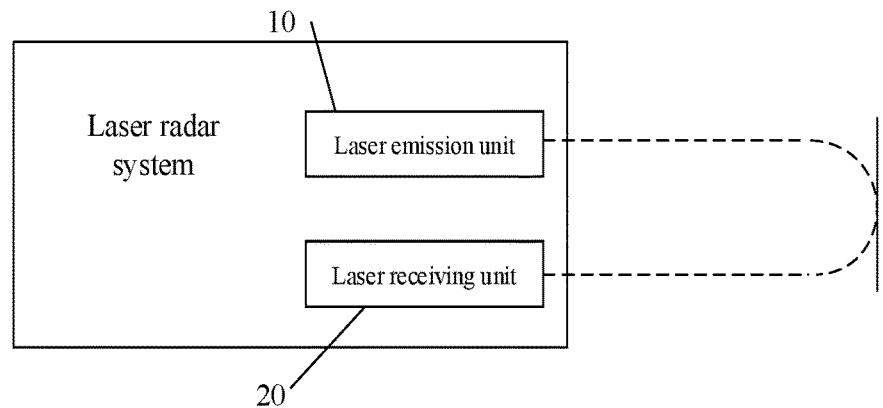
FIG. 26 is a schematic structural diagram of a laser radar system according to an embodiment.

FIG. 26 is a schematic structural diagram of a laser radar system according to an embodiment. As shown in FIG. 26, the laser radar system includes a laser emission unit 10 and a laser receiving unit 20. The laser emission unit 10 is configured to emit at least two laser pulses to a target object based on a preset emission interval within a cycle. The laser receiving unit 20 is configured to receive a plurality of external signals within the cycle, obtain a reception interval between any two external signals, and determine, in the plurality of external signals based on the emission interval and the reception interval, an echo signal corresponding to the emitted laser pulses.

The laser emission unit 10 obtains a ranging distance by multiplying a time of flight of a laser pulse between the target object and the laser radar system by a speed of light. When the laser emission unit emits laser pulses, emission duration of at least two laser pulses may be the same or different. This is not limited herein. The preset emission interval may be a fixed time interval, or a time interval dynamically adjusted based on an application scenario. This is not limited herein. The cycle may be a fixed cycle size, or adjusted according to a user instruction. This is not limited herein.

Figure 27:
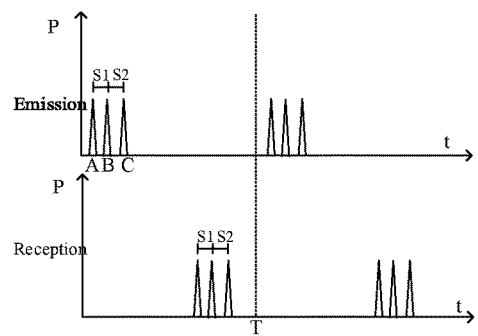
FIG. 27 is a schematic diagram of a pulse signal in a laser radar system according to an embodiment.

Specifically, when emitting at least two laser pulses to the target object based on the preset emission interval within the cycle, the laser emission unit 10 may emit at least two laser pulses within the cycle by using one laser light source, or may emit different laser pulses at different moments by using a plurality of laser light sources. This is not limited herein. When the laser emission unit 10 emits a plurality of laser pulses, an emission interval between two adjacent laser pulses may be the same or different. This is not limited herein. For example, as shown in FIG. 27, the laser emission unit 10 emits three laser pulses: a pulse A, a pulse B, and a pulse C. An emission interval between the pulse A and the pulse B is S1, and an emission interval between the pulse B and the pulse C is S2. In this case, S1 and S2 form a time jitter feature of the laser emission unit.

The laser receiving unit 20 may receive the plurality of external signals within the cycle. The external signals may include an echo signal returned after a laser emitted by the laser emission unit 10 encounters the target object; or may include an interfering laser signal emitted by another laser radar nearby, or an interfering echo signal returned by the target object, another object, or the like. The laser receiving unit 20 may obtain the reception interval between any two external signals, and then determine, based on the emission interval and the reception interval, the echo signal corresponding to the emitted laser pulses.

After the laser emission unit 20 sends at least two laser pulses based on the preset emission interval within the cycle, the at least two laser pulses are sequentially returned after encountering the same target object, to form at least two echo signals. Because a distance between the laser radar system and the target object remains unchanged, there is a correspondence between the emission interval and the reception interval between the at least two echo signals that are returned. The laser emission unit 20 may determine the external signal corresponding to a reception interval that matches the emission interval as an echo signal. For example, it may be considered that the emission interval matches the reception interval if a difference between the emission interval and the reception interval is within a preset error range. In addition, when the reception interval is equal to the emission interval, the laser emission unit 20 may determine two external signals corresponding to the reception interval as echo signals.

The laser receiving unit 20 may obtain a reception interval between any two external signals in all external signals, and then determine, from each of the foregoing reception intervals, an external signal matching the emission interval and determine the external signal as an echo signal. A specific manner of determining an echo signal by the laser emission unit 20 is not limited herein.

The foregoing laser radar system includes a laser emission unit and a laser receiving unit. The laser emission unit is configured to emit at least two laser pulses to a target object based on a preset emission interval within a cycle. The laser receiving unit is configured to receive a plurality of external signals within the cycle, obtain a reception interval between any two external signals, and determine, in the plurality of external signals based on the emission interval and the reception interval, an echo signal corresponding to the emitted laser pulses. The laser emission unit sends the at least two laser pulses based on the preset emission interval within the cycle. In this case, after the at least two laser pulses encounter the same target object, a reception interval between at least two echo signals that are returned matches the emission interval, and an interval between interfering signals received by a receiving circuit does not match the emission interval. Therefore, the laser receiving unit may determine the echo signals based on the emission interval and the reception interval, so that an anomaly in a ranging result can be avoided in the laser radar system, and an anti-interference capability of the laser radar system can be improved.

A smaller emission interval between at least two laser pulsed lights emitted by the laser emission unit 10 within a cycle indicates a larger maximum distance that can be measured when the laser radar system measures a distance of a target object. However, a laser light source can hardly emit two laser pulses within a very short time interval. Therefore, when a laser light source emits one laser pulse, a laser optical path may be adjusted to output at least two laser pulses with an emission interval within a cycle.

Figure 28:
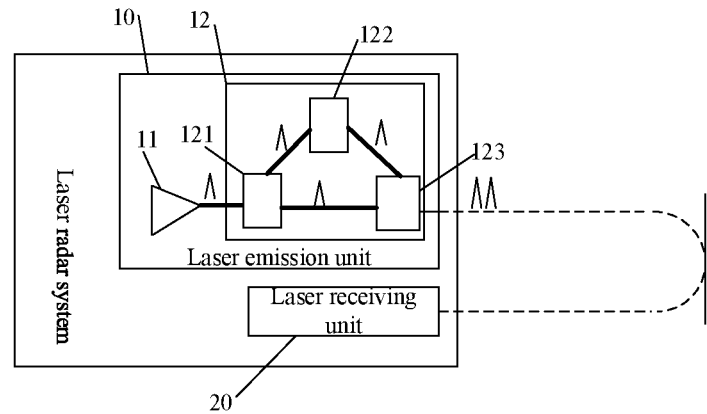
FIG. 28 is a schematic structural diagram of a laser radar system according to another embodiment.

FIG. 28 is a schematic structural diagram of a laser radar system according to another embodiment. This embodiment relates to a laser emission unit. Based on the foregoing embodiment, as shown in FIG. 28, the laser emission unit includes a first laser emitter 11 and a laser delaying optical path 12. The first laser emitter 11 is configured to emit a first emitting laser pulse. The laser delaying optical path 12 is configured to receive the first emitting laser pulse, delay part of lasers in the first emitting laser pulse, and output at least two laser pulses with an emission interval.

Specifically, the first laser emitter 11 may be a solid laser emitter, or a semiconductor laser emitter. This is not limited herein. When the first laser emitter 11 emits the first emitting laser pulse, a laser emission cycle and a laser pulse width are not limited. The first laser emitter 11 may directly emit the first emitting laser pulse to the laser delaying optical path 12, or may emit the first emitting laser pulse to the laser delaying optical path 12 by using a collimating mirror. This is not limited herein.

When the laser delaying optical path 12 is configured to receive the first emitting laser pulse and then delay part of lasers in the first emitting laser pulse, the laser delaying optical path 12 may first emit lasers that are not delayed, and after an emission interval corresponding to the delaying elapses, emit the lasers that are delayed, so that the laser delaying optical path 12 may convert a laser pulse emitted by the first laser emitter into two laser pulses with an emission interval. The laser delaying optical path 12 may perform delaying by using an optical fiber, or may perform delaying by using a distance between optical elements in the laser delaying optical path 12. A manner of forming the laser delaying optical path 12 is not limited herein.

Optionally, the laser delaying optical path 12 includes a laser splitting unit 121, a laser delaying unit 122, and a laser combination unit 123. The laser splitting unit 121 is configured to split the first emitting laser pulse into a first laser pulse and a second laser pulse, send the first laser pulse to the laser delaying unit 122, and send the second laser pulse to the laser combination unit 123. The laser delaying unit 122 is configured to delay the received first laser pulse to obtain a third laser pulse, where there is an emission interval between the third laser pulse and the second laser pulse. The laser combination unit 123 is configured to emit the received second laser pulse and third laser pulse to the target object.

The laser splitting unit 121 is configured to split the first emitting laser pulse into the first laser pulse and the second laser pulse. The first emitting laser pulse may be split into the first laser pulse and the second laser pulse by using a splitter, or this may be implemented by a polarizer. A type of the laser splitting unit 121 is not limited herein. Laser energy of the first laser pulse and the second laser pulse obtained by the laser splitting unit 121 may be the same or different. The laser splitting unit 121 sends the second laser pulse to the laser combination unit 123, and then the laser combination unit 123 emits the second laser pulse to the target object. Meanwhile, the laser splitting unit 121 sends the first laser pulse to the laser delaying unit 122

The laser delaying unit 122 is configured to delay the received first laser pulse. For example, a propagation direction of the first laser pulse may be adjusted, so that the first laser pulse can reach the laser combination unit 123 only after the second laser pulse reaches the laser combination unit 123 for a period of time.

When the third laser pulse reaches the laser combination unit 123, a propagation direction of the third laser pulse may be different from that of the first laser pulse. The laser combination unit 123 may adjust the propagation direction of the first laser pulse or the third laser pulse, and then emits the second laser pulse and the third laser pulse that are received at different moments to the target object through a same laser exit.

In the foregoing laser radar system, delaying of some lasers is adjusted by using the laser delaying optical path, so that an emission interval between two laser pulses emitted by the laser emission unit is very small, thereby increasing a ranging range of the laser radar system and improving a detection capability of the laser radar system.

Figure 29:
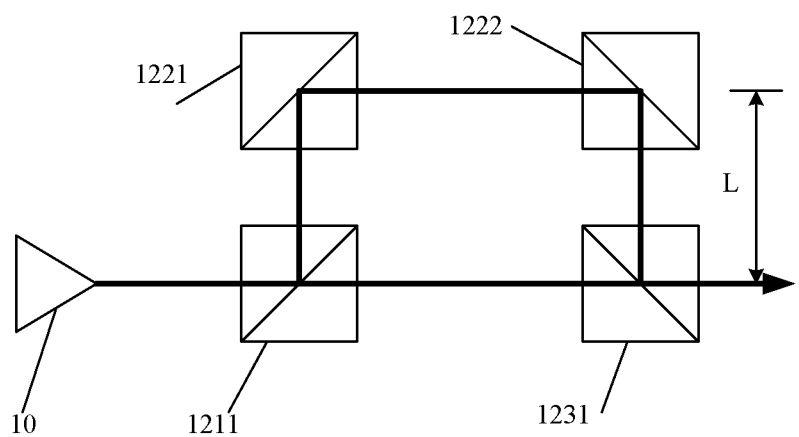
FIG. 29 is a schematic structural diagram of a laser emission unit according to an embodiment.

FIG. 29 is a schematic structural diagram of a laser emission unit according to another embodiment. Based on the foregoing embodiment, as shown in FIG. 29, the laser splitting unit 121 is a first polarizing splitter 1211, and the laser combination unit 123 is a second polarizing splitter 1231. The first polarizing splitter 1211 is configured to split the first emitting laser pulse into a S-polarization first laser pulse and a P-polarization second laser pulse, send the S-polarization first laser pulse to the laser delaying unit 122, and transmit the P-polarization second laser pulse to the second polarizing splitter 1231. The second polarizing splitter 1231 is configured to receive the P-polarization second laser pulse and output the P-polarization second laser pulse through transmission, and receive an S-polarization third laser pulse and output the third laser pulse through reflection.

Specifically, after the first emitting laser pulse reaches the first polarizing splitter 1211, the first polarizing splitter 1211 may reflect S-polarization light in the first emitting laser pulse, and transmit P-polarization light in the first emitting laser pulse, to obtain the S-polarization first laser pulse and the P-polarization second laser pulse. The laser delaying unit 122 is disposed in a propagation path of the S-polarization first laser pulse to delay the first laser pulse to obtain the third laser pulse. The second polarizing splitter 1231 is disposed in a propagation path of the P-polarization second laser pulse. Because the second laser pulse is of the P polarization, the second polarizing splitter 1231 may directly output the second laser pulse through transmission.

The laser delaying unit 122 emits the generated third laser pulse to the second polarizing splitter 1231. Because the third laser pulse is obtained by delaying the first laser pulse, the third laser pulse is also of the S polarization, so that the third laser pulse can be output by the second polarizing splitter 1231 through reflection.

Optionally, the laser delaying unit 122 includes a first total reflection prism 1221 and a second total reflection prism 1222. The first total reflection prism 1221 is configured to reflect the first laser pulse to the second total reflection prism 1222. The second total reflection prism 1222 is configured to reflect the received laser pulse to the second polarizing splitter 1231.

The first total reflection prism 1221 is disposed in the propagation path of the S-polarization first laser pulse, and may reflect the first laser pulse to the second total reflection prism 1222, where a distance between the first total reflection prism 1221 and the first polarizing splitter 1211 may be denoted as L1. After receiving the first laser pulse emitted by the first total reflection prism 1221, the second total reflection prism 1222 may reflect the first laser pulse to the second polarizing splitter 1231 to obtain the third laser pulse. In other words, after the first polarizing splitter 1211 splits the first emitting laser pulse into the first laser pulse and the second laser pulse, because prorogation paths of the two laser pulses are different, times at which they reach the second polarizing splitter 1231 are also different, so that there is an emission interval between the two laser pulses emitted by the second polarizing splitter 1231 to the target object.

In the foregoing laser emission unit, a distance of an optical path formed by an element in the laser delaying unit 122 and an element in the laser splitting unit 121 is adjustable, and the length of the distance is related to duration of the emission interval.

When the distance L between the first total reflection prism 1221 and the first polarizing splitter 1211 changes, the time interval between the two laser pulses received by the second polarizing splitter 1231 also changes correspondingly. For example, if the distance L increases, the distance between the second total reflection prism 1222 and the second polarizing splitter 1231 is also adjusted correspondingly. In this case, the emission interval between the two laser pulses emitted by the second polarizing splitter 1231 to the target object also increases.

In the foregoing laser radar system, splitting and combination of laser signals are implemented by the first polarizing splitter and the second polarizing splitter, and the propagation path of the first laser pulse is changed by using two total reflection prisms, so that the propagation path is extended, and the laser emission unit can emit two laser pulses with an emission interval within a circle.

A larger quantity of laser pulses emitted by the laser emission unit 10 indicates a more obvious time jitter feature formed by time intervals between a plurality of laser pulses, so that the laser receiving unit 20 can more accurately determine, in a plurality of external signals, an echo signal corresponding to a laser pulse emitted by the laser radar system.

In an embodiment, based on the foregoing laser radar system, the first laser emitter 11 may emit at least two laser pulses to the laser delaying optical path 12 based on a preset emission interval within a cycle.

Figure 30:
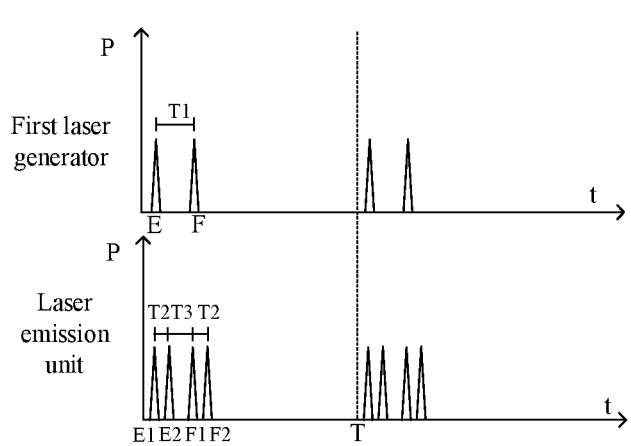
FIG. 30 is a schematic diagram of a pulse signal in a laser radar system according to another embodiment.

As shown in FIG. 30, two laser pulses emitted by the first laser emitter 11 within a cycle are pulse E and pulse F, where an emission interval between the pulse E and the pulse F is T1. After the pulse E goes through the laser delaying optical path 12, pulse E1 and pulse E2 are output. After the pulse F goes through the laser delaying optical path 12, pulse F1 and pulse F2 are output. A delay T2 of the laser delaying optical path 12 may be adjusted so that the laser delaying optical path 12 sequentially outputs the pulse E1, the pulse E2, the pulse F1, and the pulse F2. As shown in FIG. 30, an interval between the pulse E1 and the pulse E2 is T2, an interval between the pulse E2 and the pulse F1 is T3=T1−T2, and an interval between the pulse F1 and the pulse F2 is T2. Emission intervals between the four laser pulses are T2, T3, and T2 respectively, forming a time jitter feature of the laser radar system.

In the foregoing laser radar system, when the first laser emitter emits at least two laser pulses, more laser pulses may be obtained through the laser delaying optical path 12, so that a time jitter feature of laser pulses emitted by the laser radar system is more obvious, thereby helping improve the anti-interference capability of the laser radar system.

In the laser radar system, the laser emission unit includes one laser light source. When an emission interval between laser pulses is adjusted by using a distance between optical elements in the laser delaying optical path, a volume of the laser radar system is comparatively large due to increase of the distance between the optical elements. To miniaturize the laser radar system, two laser light sources may be disposed.

Figure 31:
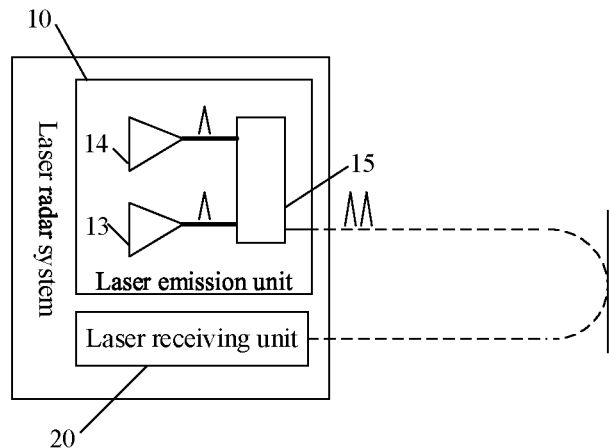
FIG. 31 is a schematic structural diagram of a laser radar system according to another embodiment.

FIG. 31 is a schematic structural diagram of a laser radar system according to another embodiment. This embodiment relates to a case in which the laser emission unit 10 includes two laser light sources. Based on the foregoing embodiment, the laser emission unit 10 includes a second laser emitter 13, a third laser emitter 14, and a laser combination optical path 15. The second laser emitter 13 and the third laser emitter 14 emit a second emitting laser pulse and a third emitting laser pulse respectively within a cycle. The laser combination optical path 15 is configured to combine the second emitting laser pulse and the third emitting laser pulse, and emit a combined laser pulse to a target object.

Specifically, the second laser emitter 13 and the third laser emitter 14 may emit the second emitting laser pulse and the third emitting laser pulse to the laser combination optical path 15 within the cycle respectively. The second laser emitter 13 and the third laser emitter 14 may be the same or different. This is not limited herein. The second laser emitter 13 and the third laser emitter 14 may separately emit, under control of one controller, laser pulses according to emission instructions sent by the controller, so that there is an emission interval between the second emitting laser pulse and the third emitting laser pulse. Alternatively, after emitting the second emitting laser pulse, the second laser emitter 13 may directly send an instruction to the third laser emitter 14, so that the third laser emitter 14 may wait, according to the instruction, a certain emission interval, and then emit the third emitting laser pulse. This is not limited herein. Further, an interval of emitting laser pulse by the second laser emitter 13 and the third laser emitter 14 may be adjusted.

Locations of the second laser emitter 13 and the third laser emitter 14 may be different. The laser combination optical path 15 may combine the second emitting laser pulse and the third emitting laser pulse, and emit the combined laser pulse to the target object. The laser combination optical path 15 may include a laser transmission connection port and an optical fiber, or may include optical elements such as a laser combiner. This is not limited herein.

In the foregoing laser radar system, an emission interval between two laser light sources is adjusted to emit two laser pulses with an emission interval within a cycle, so that a distance between optical elements in the laser radar system can be very small, and the laser radar system is miniaturized. Further, two laser pulses are emitted by the two laser light sources, so that emission energy of the laser pulses can be improved, a signal-to-noise ratio of the laser pulses can be increased, and a detection capability of the laser radar system can be enhanced.

Figure 32:
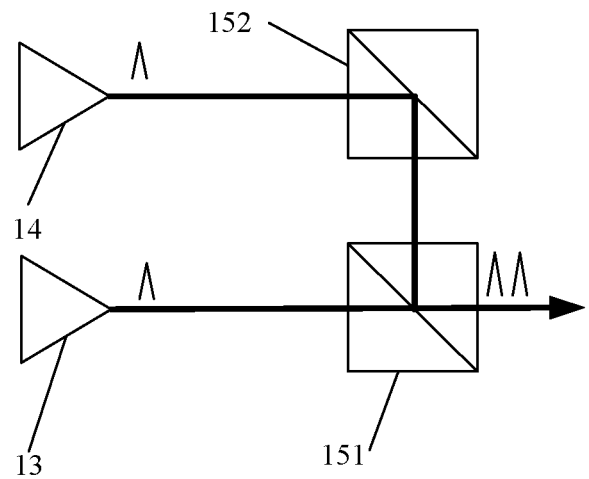
FIG. 32 is a schematic structural diagram of a laser emission unit according to an embodiment.

FIG. 32 is a schematic structural diagram of a laser emission unit according to an embodiment. This embodiment relates to a specific laser combination optical path when the laser emission unit includes two laser light sources. Based on the foregoing embodiment, as shown in FIG. 8, the second emitting laser pulse is of S polarization, the third emitting laser pulse is of P polarization, and the laser combination optical path 15 includes a third polarized splitter 151 and a third total reflection prism 152. The third total reflection prism 152 is configured to reflect the second emitting laser pulse to the third polarizing splitter 151. The third polarizing splitter 151 is configured to output, through reflection, the laser pulse sent by the third total reflection prism 152, and output the third emitting laser pulse through transmission.

In the foregoing laser radar system, the third total reflection prism and the third polarized splitter form a laser combination optical path, so that the laser radar system may emit two laser pulses with an emission interval within a cycle by using a comparatively small quantity of optical elements, thereby further reducing a volume of the laser radar system.

Figure 33:
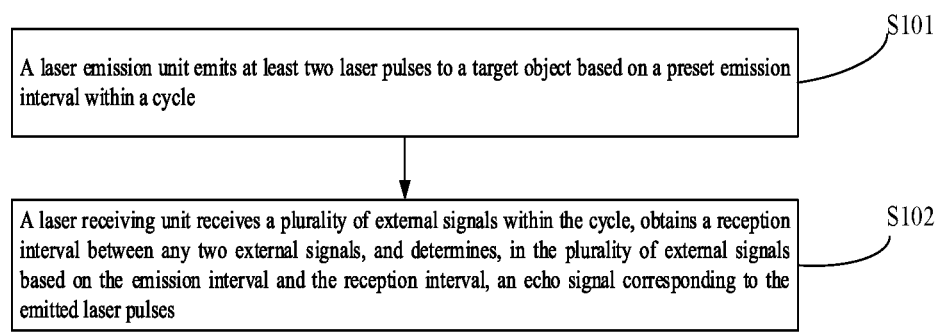
FIG. 33 is a schematic flowchart of a laser radar echo signal determining method according to an embodiment.

In an embodiment, a laser radar echo signal determining method is provided. The method is applied to the foregoing laser radar system, and the laser radar system includes a laser emission unit and a laser receiving unit. As shown in FIG. 33, the method includes the following steps:

S101: The laser emission unit emits at least two laser pulses to a target object based on a preset emission interval within a cycle.

S102: The laser receiving unit receives a plurality of external signals within the cycle, obtains a reception interval between any two external signals, and determines, in the plurality of external signals based on the emission interval and the reception interval, an echo signal corresponding to the emitted laser pulses.

An implementation principle and a technical effect of the laser radar echo signal determining method provided in this embodiment are similar to those of the method embodiments. Details are not described herein again.

The laser radar system shown in FIG. 26 includes the laser emission unit 10 and the laser receiving unit 20. The laser emission unit 10 may emit at least two laser pulses within a cycle by using any manner as shown in FIG. 27 to FIG. 32. The laser receiving unit 20 may obtain distance information by using any signal processing method as shown in FIG. 1 to FIG. 16.

For example, when emitting two laser pulses to a target object based on a preset emission interval within a cycle, the laser emission unit 10 may emit the two laser pulses within the cycle by using one laser light source, or may emit different laser pulses at different moments by using two laser light sources. This is not limited herein. When the laser emission unit 10 emits two laser pulses, an emission interval between two adjacent laser pulses may be the same or different. This is not limited herein. The laser receiving unit 20 may process the two laser pulses of the laser emission unit 10. Specifically, the laser receiving unit 20 may capture two echo pulses generated by reflecting a plurality of detection pulses at a detection target, delay the two echo pulses by a preset time to obtain two delayed echo pulses, and obtain a target echo pulse based on the two echo pulses and the two delayed echo pulses.

The laser emission unit 10 sends the two laser pulses based on the preset emission interval within the cycle, so that lasers emitted by the laser emission unit 10 may be distinguished from lasers emitted by other light sources. After the two laser pulses encounter the same target object, a reception interval between two echo signals that are returned matches the emission interval, and an interval between interfering signals received by a receiving circuit does not match the emission interval. Therefore, the laser receiving unit 20 may determine the echo signals based on the emission interval and the reception interval, so that an anomaly in a ranging result can be avoided in the laser radar system, and an anti-interference capability of the laser radar system can be improved.

It can be clearly understood by a person skilled in the art that, for convenience and brevity of description, division of the foregoing functional units or modules is only used as an example for description. In actual application, the foregoing functions may be allocated to different functional units or modules and implemented according to a requirement, that is, an inner structure of the apparatus is divided into different functional units or modules to perform all or some of the functions described above. In addition, the functional units or modules in the embodiments may be integrated into one processing unit, or each of the units may exist alone physically, or two or more units may be integrated into one unit. The integrated unit may be implemented in a form of hardware, or in a form of a software functional unit. In addition, specific names of the functional units or modules are only intended for ease of differentiation, but not to limit the protection scope of this application. For a specific working process of the units or modules in the foregoing system, refer to a corresponding process in the foregoing method embodiments. Details are not described herein again.

In the foregoing embodiments, descriptions of the embodiments have respective emphases. For a part not described in detail or not mentioned in an embodiment, refer to related descriptions in another embodiment.

The foregoing descriptions are only optional embodiments of this application, but are not intended to limit this application. Any modification, equivalent replacement and improvement made within the spirit and principle of this application shall fall within the protection scope of this application.

What is claimed is:

1. A multi-pulse anti-interference signal processing method, wherein the multi-pulse anti-interference signal processing method comprises:
sending a plurality of detection pulses to a detection target within a detection cycle, wherein a time interval between the plurality of detection pulses is a preset time;
capturing and performing analog-to-digital conversion on a plurality of echo pulses generated by reflecting the plurality of detection pulses at the detection target;
delaying the plurality of echo pulses by the preset time to obtain a plurality of delayed echo pulses;
obtaining a target echo pulse based on the plurality of echo pulses and the plurality of delayed echo pulses; and
calculating a distance of the detection target based on a time difference between the target echo pulse and the plurality of detection pulses,
wherein the plurality of detection pulses are two detection pulses, the plurality of echo pulses are two echo pulses, and the delaying the plurality of echo pulses by the preset time to obtain the plurality of delayed echo pulses comprises:
delaying the two echo pulses based on the preset time to obtain two delayed echo pulses; and
wherein obtaining the target echo pulse based on the plurality of echo pulses and the plurality of delayed echo pulses comprises:
adding up the two echo pulses and the two delayed echo pulses to generate a superposed pulse;
using an absolute value of a difference between the two echo pulses and the two delayed echo pulses as a reference pulse; and
using a difference obtained by subtracting the reference pulse from the superposed pulse as the target echo pulse.

2. The multi-pulse anti-interference signal processing method according to claim 1, wherein before the sending the plurality of detection pulses to the detection target within the detection cycle, wherein the time interval between the plurality of detection pulses is the preset time, the method further comprises:
generating the plurality of detection pulses within the detection cycle; and
the generating the plurality of detection pulses within the detection cycle comprises:
performing collimation and polarized splitting processing on a laser pulse emitted by a laser source to obtain a pulse split beam; and
performing beam combination after the pulse split beam goes through different optical paths to obtain a first group of a plurality of detection pulses; or
performing beam combination after laser pulses emitted by two laser sources go through different optical paths to obtain a second group of a plurality of detection pulses.

3. The multi-pulse anti-interference signal processing method according to claim 2, wherein the performing collimation and polarized splitting processing on the laser pulse emitted by the laser source to obtain the pulse split beam, and performing beam combination after the pulse split beam goes through different optical paths to obtain the first group of a plurality of detection pulses comprises:
emitting, by the laser source, a first original laser pulse, and performing collimation processing on the first original laser pulse to obtain a collimated laser pulse;
performing first polarized splitting processing on the collimated laser pulse to obtain a first transmitted polarized laser pulse and a first reflected polarized laser pulse;
performing second polarized splitting processing on the first transmitted polarized laser pulse to obtain a first detection pulse;
performing first total reflection processing on the first reflected polarized laser pulse to obtain a first total reflected laser pulse;
performing second total reflection processing on the first total reflected laser pulse to obtain a second total reflected laser pulse;
performing second polarized splitting processing on the second total reflected laser pulse to obtain a second detection pulse; and combining the first detection pulse and the second detection pulse for uniform output.

4. The multi-pulse anti-interference signal processing method according to claim 2, wherein the performing beam combination after laser pulses emitted by two laser sources go through different optical paths to obtain the second group of a plurality of detection pulses comprises:

emitting, by a first laser source, a second original laser pulse, and performing first collimation processing on the second original laser pulse to obtain a first collimated laser pulse;

performing first total reflection processing on the first collimated laser pulse to obtain a first total reflected laser pulse;

performing first polarized splitting processing on the first total reflected laser pulse to obtain a third detection pulse;

emitting, by a second laser source, a third original laser pulse, and performing first polarized splitting processing on the third original laser pulse to obtain a fourth detection pulse; and combining the third detection pulse and the fourth detection pulse for uniform output.

5. A multi-pulse anti-interference signal processing apparatus, comprising:

a memory, a processor, and a computer program that is stored in the memory and capable of running on the processor, wherein when executing the computer program, the processor implements a method, the method comprising:

sending a plurality of detection pulses to a detection target within a detection cycle, wherein a time interval between the plurality of detection pulses is a preset time;

capturing and performing analog-to-digital conversion on a plurality of echo pulses generated by reflecting the plurality of detection pulses at the detection target;

delaying the plurality of echo pulses by the preset time to obtain a plurality of delayed echo pulses;

obtaining a target echo pulse based on the plurality of echo pulses and the plurality of delayed echo pulses; and calculating a distance of the detection target based on a time difference between the target echo pulse and the plurality of detection pulses;

wherein the plurality of detection pulses are two detection pulses, the plurality of echo pulses are two echo pulses, and delaying the plurality of echo pulses by the preset time to obtain the plurality of delayed echo pulses comprises:

delaying the two echo pulses based on the preset time to obtain two delayed echo pulses; and wherein obtaining the target echo pulse based on the plurality of echo pulses and the plurality of delayed echo pulses comprises:

adding up the two echo pulses and the two delayed echo pulses to generate a superposed pulse;

using an absolute value of a difference between the two echo pulses and the two delayed echo pulses as a reference pulse; and using a difference obtained by subtracting the reference pulse from the superposed pulse as the target echo pulse.

* * * * *